F. F. CHERRY.
FERTILIZER DISTRIBUTER.
APPLICATION FILED SEPT. 6, 1912.
1,072,823.
Patented Sept. 9, 1913.
2 SHEETS—SHEET 1.
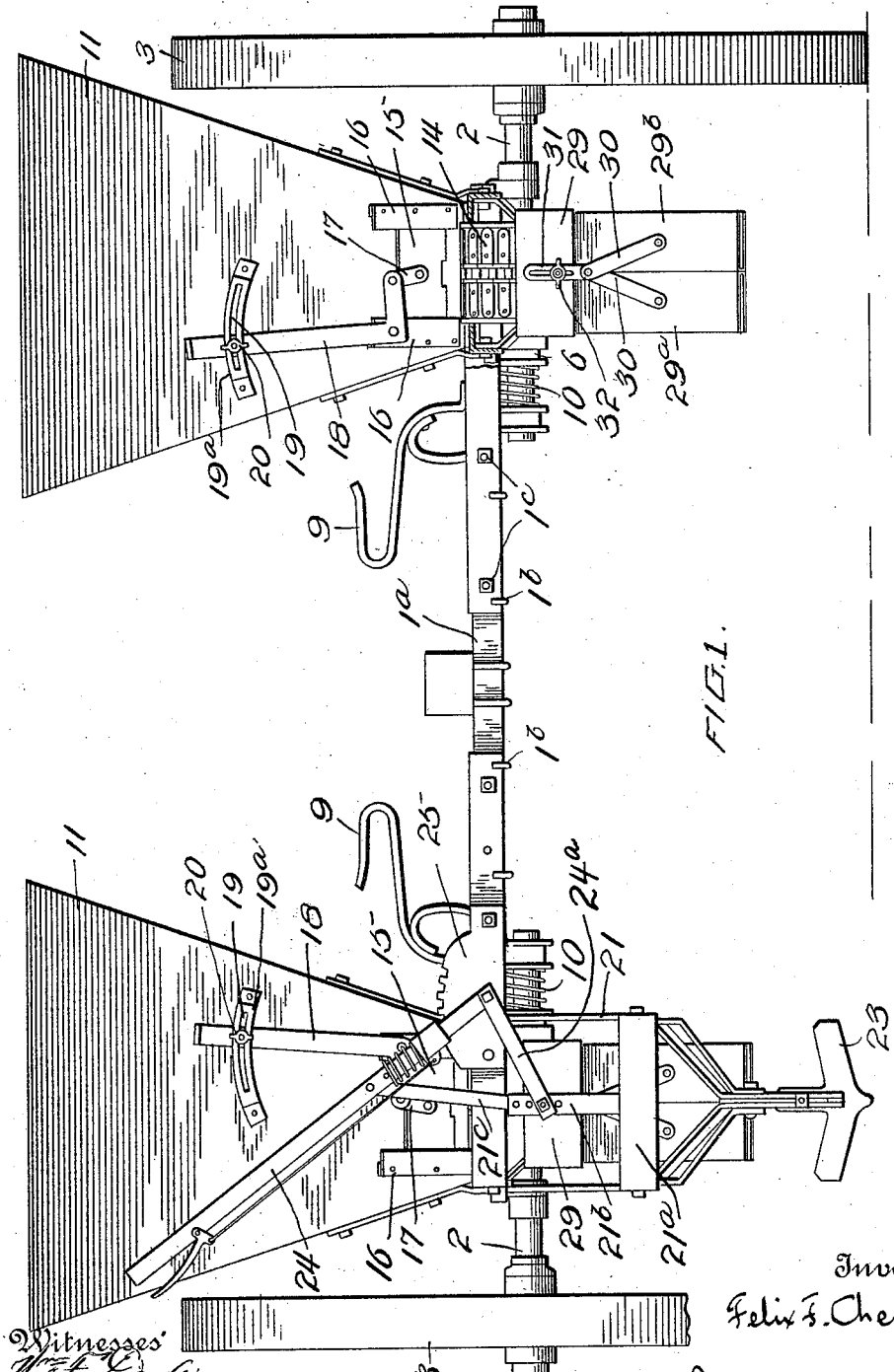

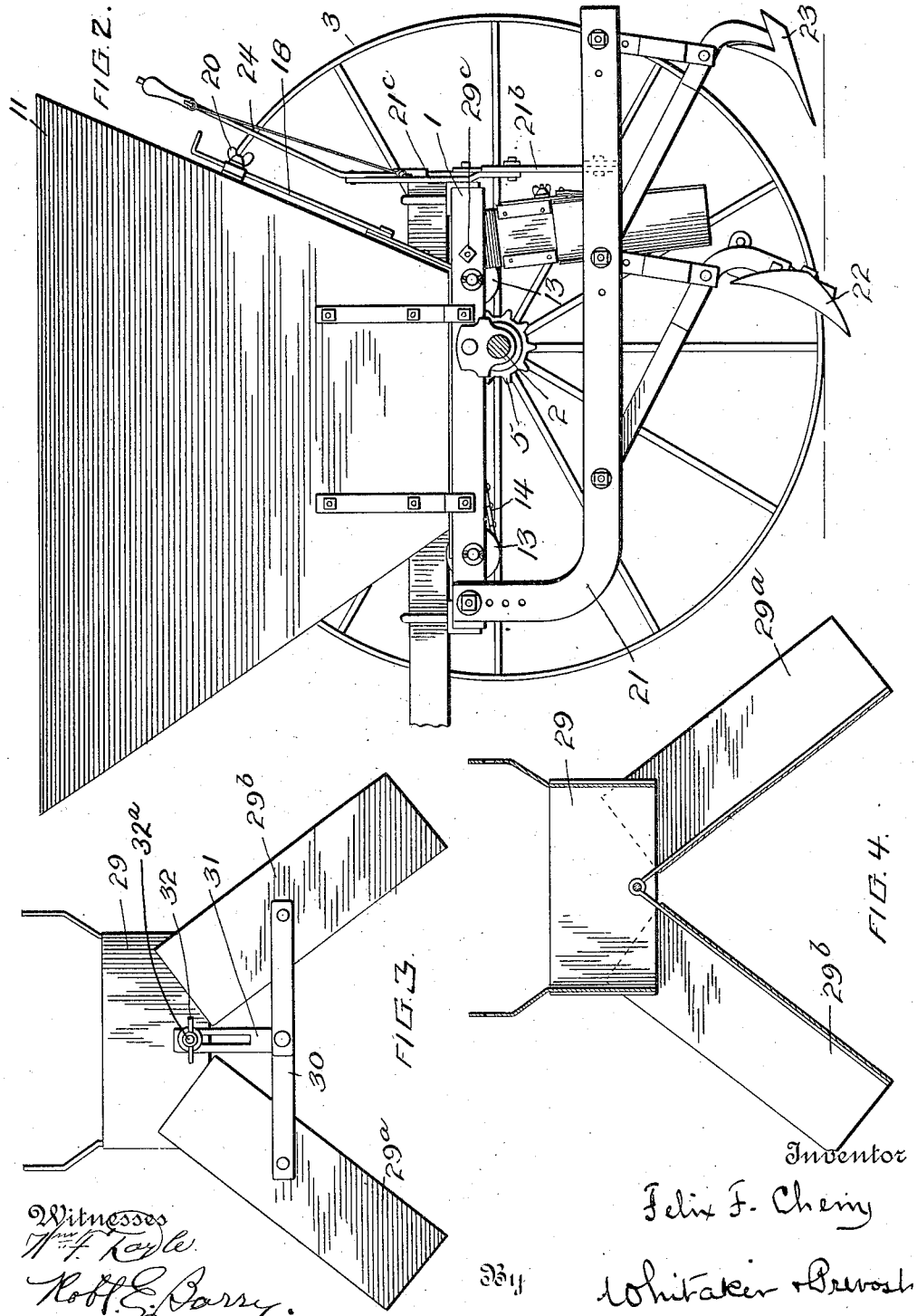

UNITED STATES PATENT OFFICE.

FELIX FURTEE CHERRY, OF AURORA, NORTH CAROLINA.

FERTILIZER-DISTRIBUTER.

1,072,823.

Specification of Letters Patent.

Patented Sept. 9, 1913.

Application filed September 6, 1912. Serial No. 718,941.

*To all whom it may concern:*

Be it known that I, FELIX F. CHERRY, a citizen of the United States, residing at Aurora, in the county of Beaufort and State of North Carolina, have invented certain new and useful Improvements in Fertilizer-Distributers; and I do hereby declare the following to be a full, clear, and exact description of the invention, such as will enable others skilled in the art to which it appertains to make and use the same.

My invention relates to fertilizer distributers of that class which are utilized for the purpose of depositing fertilizers, such as guano, lime, phosphate and the like, and has among its objects to simplify and improve the construction and operation of this class of devices.

The object of my invention is to provide a spreader which will deposit the fertilizer in a single or double row and one which may be adjusted to accommodate rows which are different distances from one another.

A practical embodiment of my invention is represented in the accompanying drawings, forming a part of this specification, in which similar characters of reference indicate corresponding parts in all the views.

In said drawings, Figure 1 is a rear view of my improved distributer having certain parts removed for the purpose of clearness. Fig. 2 is a view in elevation looking from the left hand end of the machine. Fig. 3 is a rear view of one of the pivoted chutes, the same being shown spread out to distribute a double stream. Fig. 4 is a vertical section of the same.

In the drawings 1 designates the frame, which is provided with a plurality of axles 2, upon which the ground wheels 3 are rigidly secured. The said axles are mounted and turn in suitable bearings upon the frame. Mounted loosely upon the axles 2 are clutch collars provided with sprockets 5. 6 indicates the movable clutch members. These clutch members are fitted upon the axles in such manner that they will rotate therewith but will slide freely thereon.

Levers 9 are pivoted to the frame and are so connected to the movable members of the clutches that by pressing the inner ends of said levers forward said clutch members are withdrawn from engagement with the clutch collars, and the ground wheels revolve without affecting any movement of the distributing mechanism. The levers are held in their inoperative position by suitable means. Springs 10 are provided upon the axles 2 to normally hold the clutch members 6 in engagement with the clutch collars.

Mounted upon the frame 1 in a suitable manner are the hoppers 11, which are provided at the lower part of their front and rear sides with horizontal openings. Plates form the bottoms of said hoppers and also serve as supporting means for the feed chains through the bottoms of said hoppers.

Mounted in the frame 1 are the idle pulleys 13 over which the feeder chains 14 travel. The surfaces of the idle pulleys are smooth and the pulleys are provided with raised edges to hold the chain thereon. These feeder chains are shown as actuated by sprockets 5. When the clutch members 6 are thrown in operation with the clutch collars, the chains 14 will be moved toward the rear of the hoppers to feed the fertilizer therefrom. These chains move over the bottoms and through the horizontal openings of the hoppers. The horizontal openings in the rear are provided with gates 15 for regulating the flow of the fertilizer from the hoppers. These gates move in grooved pieces 16 and are provided with pivoted links 17, the upper ends of which are pivoted to the short arms of bell crank levers 18. The upper ends of the levers 18 are provided with threaded pins or bolts which extend outward through the curved slots 19 in brackets 19$^a$ and are secured in any predetermined position by means of thumb nuts 20.

Beams 21, upon which the plows 22 and covering shovels 23 are mounted, are pivoted at their front ends to the frame 1. The plows 22 are for the purpose of opening furrows in which the fertilizer is to be deposited, while the shovels 23 follow after the deposit of the fertilizer to cover the same. Each beam 21 is formed of two pieces and at their rear ends are connected by a cross bar 21$^a$. An arm 21$^b$ is secured thereto and extends upward therefrom. The upper end of this arm is connected by a link 21$^c$ with a lever 24. A further link 24$^a$ connects the upper end of arm 21$^b$ with the pivot of said lever. The beam is lifted by the lever 24 and the link 21$^c$, the link 24$^a$ merely serving to maintain the arm 21$^b$ in approximately vertical position. The lever 24 is maintained in a desired position by a dog 24ᵇ engaging a tooth sector 25 in a well known way.

Chutes 29 are pivoted to the frame 1 at 29ᶜ to permit the same to rock should they encounter any solid obstacle, to prevent the same from breaking. To each of these chutes are pivoted two troughs 29ᵃ and 29ᵇ for the purpose of directing the fertilizer to a point near the ground. Each of these troughs has pivoted thereto a link 30 and these links are pivotally connected at their tops and connected to a slotted link 31. A threaded pin or bolt 32ᵃ is provided upon the chute and extends outward through the slot in the link 31 and secures the link upon the same in a desired position, by means of a thumb nut 32. When it is desired to deliver the fertilizer in a direct downward path, the thumb nuts are loosened, the slotted links raised to their highest position and the nuts tightened, as shown in Fig. 1. This permits the fertilizer to be distributed in the furrow. When, however, it is desired to spread on the sides of a row or furrow, the links 31 are pushed downward to spread the lower ends of the troughs 29ᵃ and 29ᵇ away from one another, as shown in Figs. 3 and 4.

For the purpose of permitting the machine to be adjusted laterally to accommodate rows that are different distances apart, I provide bars 1ᵃ between the two sides of the frame proper. These bars are held in connection with the two sides by hook bolts 1ᵇ and the bolts and nuts 1ᶜ.

What I claim and desire to secure by Letters Patent is:—

1. In a machine of the class described, the combination with a main frame, a hopper mounted upon said frame, means for discharging a fertilizing material from said hopper, a pivoted chute into which said material is adapted to fall, and two troughs pivotally connected to said chute, the lower ends of said troughs being adjustable to permit the material to be discharged in a single line or in two more or less separated lines.

2. In a machine of the class described, the combination with a main frame, a hopper mounted upon said frame, means for discharging a fertilizing material from said hopper, a chute pivotally connected to said frame and adapted to swing longitudinally of said machine, and troughs pivotally connected to said chute, the lower ends of said troughs being adjustable laterally to permit the material to be discharged in a single line or two more or less separated lines.

3. In a machine of the class described, the combination with a main frame, of a hopper mounted upon said frame, means for discharging a fertilizing material from said hopper, a chute pivotally connected to said frame and adapted to receive the discharged material, said chute being pivoted transversely of said machine, and troughs pivotally connected to said chute longitudinally of said machine, the lower ends of said troughs being adjustable laterally to permit the material to be discharged in a single line or in two more or less separated lines.

In testimony whereof I affix my signature, in the presence of two witnesses.

FELIX FURTEE CHERRY.

Witnesses:
  D. M. DOUGH,
  J. A. BONNER.

---

Copies of this patent may be obtained for five cents each, by addressing the "Commissioner of Patents, Washington, D. C."